United States Patent
Cunetto et al.

(10) Patent No.: US 7,307,993 B2
(45) Date of Patent: Dec. 11, 2007

(54) CONTROLLER BASED CALL CONTROL FOR ATM SVC SIGNALING

(75) Inventors: Philip Cunetto, Austin, TX (US); James M. Doherty, Georgetown, TX (US); Chien-Chun Lu, Austin, TX (US); Timothy Paul Schroeder, Austin, TX (US)

(73) Assignee: AT&T Labs, Inc., Austin, TX (US)

( * ) Notice: Subject to any disclaimer, the term of this patent is extended or adjusted under 35 U.S.C. 154(b) by 815 days.

(21) Appl. No.: 09/923,351

(22) Filed: Aug. 8, 2001

(65) Prior Publication Data

US 2002/0024954 A1   Feb. 28, 2002

Related U.S. Application Data

(60) Provisional application No. 60/223,862, filed on Aug. 8, 2000.

(51) Int. Cl.
  *H04L 12/28* (2006.01)
(52) U.S. Cl. ............ 370/395.2; 370/400; 709/222
(58) Field of Classification Search ........... 370/395.2, 370/395.3, 395.52, 410, 397, 389, 395.1, 370/400, 395.5, 522, 524, 438, 282
  See application file for complete search history.

(56) References Cited

U.S. PATENT DOCUMENTS

| | | | |
|---|---|---|---|
| 4,494,231 A | 1/1985 | Slawy et al. | |
| 5,051,982 A | 9/1991 | Brown et al. | |
| 5,274,643 A | 12/1993 | Fisk | |
| 5,490,141 A | 2/1996 | Lai et al. | |
| 5,610,969 A | 3/1997 | McHerry et al. | |
| 5,764,645 A | 6/1998 | Bernet et al. | |
| 5,828,838 A | 10/1998 | Downs et al. | |
| 5,842,040 A | 11/1998 | Hughes et al. | |
| 5,892,924 A | 4/1999 | Lyon et al. | |
| 5,903,559 A * | 5/1999 | Acharya et al. | 370/355 |
| 5,920,562 A | 7/1999 | Christie et al. | |
| 5,923,740 A | 7/1999 | Ito et al. | |

(Continued)

FOREIGN PATENT DOCUMENTS

EP        0961519      12/1999

(Continued)

OTHER PUBLICATIONS

Printout of a website entitled "Abstract—Security for Asynchronous Transfer Mode (ATM) Networks", WPI Department of Electrical and Computer Engineering, last modified Apr. 23, 1996.

(Continued)

*Primary Examiner*—Hassan Kizou
*Assistant Examiner*—Brian Roberts
(74) *Attorney, Agent, or Firm*—Greenblum & Bernstein, P.L.C.

(57) ABSTRACT

A system allows switch signaling to be processed in a controller adjunct to a switch, and for the controller to effect the connection by signaling to the switch. This is accomplished by an end unit communicating service information to a controller and the controller instructing the switch to carry out the service transaction. The service information from the end unit is routed through the switch being controlled by the controller.

10 Claims, 6 Drawing Sheets

U.S. PATENT DOCUMENTS

| | | | |
|---|---|---|---|
| 5,943,337 A | 8/1999 | Sasagawa | |
| 5,953,338 A | 9/1999 | Ma et al. | |
| 5,956,334 A | 9/1999 | Chu et al. | |
| 5,970,064 A | 10/1999 | Clark et al. | |
| 5,974,048 A | 10/1999 | Godse et al. | |
| 5,991,301 A | 11/1999 | Christie | |
| 5,999,514 A | 12/1999 | Kato | |
| 5,999,518 A | 12/1999 | Nattkemper et al. | |
| 5,999,532 A | 12/1999 | Terasaki | |
| 6,028,924 A | 2/2000 | Ram et al. | |
| 6,028,933 A | 2/2000 | Heer et al. | |
| 6,031,840 A | 2/2000 | Christie et al. | |
| 6,032,118 A | 2/2000 | Tello et al. | |
| 6,035,405 A | 3/2000 | Gage et al. | |
| 6,041,109 A | 3/2000 | Cardy et al. | |
| 6,073,160 A | 6/2000 | Grantham et al. | |
| 6,081,518 A | 6/2000 | Bowman-Amuah | |
| 6,094,437 A | 7/2000 | Loehndorf, Jr. et al. | |
| 6,097,720 A | 8/2000 | Araujo et al. | |
| 6,097,722 A | 8/2000 | Garham et al. | |
| 6,118,785 A | 9/2000 | Araujo et al. | |
| 6,137,793 A | 10/2000 | Gorman et al. | |
| 6,141,339 A | 10/2000 | Kaplan et al. | |
| 6,148,074 A | 11/2000 | Miloslavsky et al. | |
| 6,167,432 A | 12/2000 | Jiang | |
| 6,169,735 B1 | 1/2001 | Allen, Jr. et al. | |
| 6,181,693 B1 | 1/2001 | Maresca | |
| 6,219,348 B1 | 4/2001 | Allen, Jr. et al. | |
| 6,222,842 B1 | 4/2001 | Sasyan et al. | |
| 6,229,810 B1 | 5/2001 | Gerszberg et al. | |
| 6,252,857 B1 | 6/2001 | Fendick et al. | |
| 6,289,001 B1 * | 9/2001 | Smyk | 370/216 |
| 6,292,495 B1 | 9/2001 | Von Hammerstein et al. | |
| 6,298,043 B1 | 10/2001 | Mauger et al. | |
| 6,345,048 B1 | 2/2002 | Allen, Jr. et al. | |
| 6,345,051 B1 | 2/2002 | Gupta et al. | |
| 6,366,577 B1 | 4/2002 | Donovan | |
| 6,366,948 B1 | 4/2002 | Teibel | |
| 6,373,930 B1 | 4/2002 | McConnell et al. | |
| 6,389,011 B2 | 5/2002 | Allen, Jr. et al. | |
| 6,400,716 B1 * | 6/2002 | Munakata et al. | 370/236.2 |
| 6,434,612 B1 | 8/2002 | Hughes et al. | |
| 6,473,427 B1 | 10/2002 | Brodigan | |
| 6,473,430 B2 * | 10/2002 | Sreedharan et al. | 370/395.63 |
| 6,529,479 B1 | 3/2003 | Suzuki | |
| 6,542,475 B1 | 4/2003 | Bala et al. | |
| 6,563,835 B1 | 5/2003 | Chen | |
| 6,597,689 B1 * | 7/2003 | Chiu et al. | 370/354 |
| 6,618,381 B1 | 9/2003 | Miyamoto et al. | |
| 6,621,793 B2 | 9/2003 | Widegren et al. | |
| 6,633,569 B2 * | 10/2003 | Hemmady | 370/398 |
| 6,801,508 B1 | 10/2004 | Lim | |
| 6,842,449 B2 | 1/2005 | Hardjono | |
| 2001/0026553 A1 | 10/2001 | Gallant et al. | |
| 2002/0010866 A1 | 1/2002 | McCullough et al. | |
| 2002/0071427 A1 | 6/2002 | Schneider et al. | |
| 2002/0126674 A1 * | 9/2002 | Hemmady | 370/395.1 |
| 2002/0143959 A1 | 10/2002 | El-Baze et al. | |
| 2002/0150110 A1 | 10/2002 | Inbar et al. | |
| 2002/0156914 A1 | 10/2002 | Lo et al. | |
| 2003/0016676 A1 | 1/2003 | Allen et al. | |
| 2003/0031184 A1 | 2/2003 | Cunetto | |
| 2003/0128698 A1 | 7/2003 | Darland et al. | |
| 2003/0133454 A1 | 7/2003 | Gallant et al. | |
| 2004/0107238 A1 | 6/2004 | Orton et al. | |

FOREIGN PATENT DOCUMENTS

| | | |
|---|---|---|
| JP | 8-186580 | 7/1996 |
| WO | 98/26627 | 6/1998 |
| WO | 98/36612 | 8/1998 |
| WO | 98/37727 | 8/1998 |
| WO | 99/30530 | 6/1999 |
| WO | 00/62496 | 10/2000 |
| WO | 02/12977 | 2/2002 |
| WO | 03/009528 | 1/2003 |

OTHER PUBLICATIONS

Printout of a website entitled "ATM Security VPN Case Study", by Winkelstein, Celotek Corporation.

B. Riggs, "Telcos to Open ATM SVC Floodgate", Mar. 1997, pp. 1-3, downloaded from a website at www.lantimes.com.

"Voice Over ATM Switched Virtual Circuits on the Cisco MC3810", pp. 1-5, downloaded from a website at www.cisco.com.

S. Taylor et al., "Do You Need Frame-to-ATM SVC", Jun. 2000, pp. 1-2, downloaded from a website at www.nwfusion.com.

Yager, C., "White Paper: Cisco Asymmetric Digital Subscriber Line Services Architecture", Cisco Systems, published Jul. 3, 2002.

W. Marshall et al., "SIP Extensions for Media Authorization," Feb. 2001, pp. 1-23, <draft-ietf-sip-call-auth-01.txt>.

W. Marshall et al., "SIP Extensions for Media Authorization," Nov. 2000, pp. 1-25, <draft-ietf-sip-call-auth-00.txt>.

Clark et al., "Bandwidth-on-Demand Networks—A Solution to Peer-to-Peer File Sharing", BT Technology Journal, vol. 20, No. 1, Jan. 2002, pp. 53-63.

Loeser et al., "Distributed Video on Demand Services on Peer to Peer Basis", 1st International Workshop on Real Time LANs in the Internet Age, Jun. 18, 2002, pp. 1-4, downloaded from a website at www.hurray.isep.ipp.pt/rtlia2002/full_papers/20_rtlia.pdf.

P.W. Reece et al., "The Broadband Call Control Demonstrator—A Platform for ITU-T, David and Tina-C Implementations", BT Technology Journal, vol. 16, No. 2, Apr. 1, 1998, pp. 155-168.

English Language Abstract of JP 8-186580.

"Ipsilon's General Switch Management Protocol Specification: The Internet Society, 1998", version 2, by Newman et al., The Internet Society, Networking Group, 1998, pp. 1-79.

"Method for the Conversion of Multimedia Streams to Packet Streams", IBM Technical Disclosure Bulletin, Jun. 1994, pp. 95-98.

Bauer et al., "The Personal Router", The Eight ACM International Conference on Mobile Computing and Networking, Sep. 23-28, 2002, p. 1.

"User Interface Design for Videoconferencing Entries", IBM Technical Disclosure Bulletin, Apr. 1994, pp. 539-540.

Clark et al., "The Personal Router Whitepaper", MIT Laboratory for Computer Science, Version 2.0, Mar. 2001,<http://ana.lcs.mit.edu/anaweb/PDF/PR_whitepaper_v2.pdf>.

"cnfport: Configure Port—PXMIE", Cisco MGX 8830, MGX 8850 (PXM45 and PXMIE), and MGX 8950 Command Reference, Release 3, Part No. 78-14789-01 Rev. B0, Jan. 2003, p. 2-299.

"dspport: Display Port—PXMIE", Cisco MGX 8830, MGX 8850 (PXM45 and PXMIE), and MGX 8950 Command Reference, Release 3, Part No. 78-14789-01 Rev. B0, Jan. 2003, p. 2-749.

Zhou, S., et al., "Efficient Location Management for Hybrid Wireless ATM Networks: Architecture and Performance Analysis," 1999, IEEE, pp. 378-382.

"Efficient Routing of Packets for Multimedia, Peer to Peer Applications," IBM Technical Disclosure Bulletin, May 1994, pp. 459-460.

Multi-Service Switching Forum Physical Realization Subcommitte, "Physical Realizations of the MSF Functional Architecture" (dated Jun. 30, 1999), Revision 1.1, sections 2.2 to 2.2.1.2.

\* cited by examiner

CONTROLLER BASED CALL CONTROL FOR ATM SVC SIGNALING

CROSS REFERENCE TO RELATED APPLICATION

This application claims the benefit of U.S. provisional patent application No. 60/223,862, filed Aug. 8, 2000, entitled "Controller-Based Call Control for ATM SVC Signaling", in the names of CUNETTO et al., the disclosure of which is expressly incorporated herein by reference in its entirety.

BACKGROUND OF THE INVENTION

1. Field of the Invention

The invention relates to telecommunications. More particularly, the present invention relates to service signaling being processed in a controller adjunct to a switch.

2. Acronyms

The written description provided herein contains acronyms which refer to various network services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
Asymmetric Digital Subscriber Line (ADSL)
Asynchronous Transfer Mode (ATM)
Broadband Services Network (BBSN)
Customer Premise Equipment (CPE)
Digital Subscriber Line (DSL)
FTTC (Fiber To The Curb)
Integrated Services Digital Network (ISDN)
Internet Protocol (IP)
Inter Network Interface (INI)
Interworking Function (IWF)
ISDN User Part (ISUP)
Lightweight Directory Access Protocol (LDAP)
Local Area Network (LAN)
Operations, Administration, & Maintenance (OA&M)
Permanent Virtual Circuit (PVC)
Personal Computer (PC)
Public Switched Telephone Network (PSTN)
Private Network to Network Interface (PNNI)
Proxy Signaling Agent (PSA)
Quality of Service (QoS)
Signaling System 7 (SS7)
Switched Virtual Circuit (SVC)
User to Network Interface (UNI)
Virtual Channel Identifier (VCI)
Virtual Network (VN)
Virtual Path (VP)
Virtual Path Identifier (VPI)
Virtual Path Connection Identifier (VPCI)

3. Discussion of Background Information

High bandwidth ATM systems are in many cases replacing narrowband systems. As part of the migration to high bandwidth technologies, the efficient implementation of middleware services such as session management, messaging, directory, accounting, security, nomadicity, and database access are becoming problematic. In most ATM implementations, service related tasks are handled by transport layer systems using call models and triggers applied directly to transport layer devices, hindering the use and management of high bandwidth services.

A call model provides a template for the flow of service logic. Service definitions that do not fit the pre-defined flow are difficult, if not impossible, to implement in an intelligent network layer as is needed by broadband networks due in large part to the limited functionality of call models utilizing only triggers. To overcome some of the call model limitations, service nodes have arisen to provide services that do not fit current call models. But service nodes also have limitations when applied to broadband networks.

Alternative designs which entail signaling to a transport element, and then have the transport element "trigger" or signal to a network element for policy management decisions have enabled more service functionality; however, triggering is very costly due to additional software development costs and low functioning standardization. Moreover, such standardization typically requires additional signaling schemes between transport elements and network elements and modification of the flow of processing in the transport elements. The result being that transport elements eventually become a bottleneck in the deployment of new services because they must be updated with the new protocols and "call model" modifications as each new service is rolled out. In such an environment, the likelihood increases that switches from different vendors do not implement the same call model or protocol options and additional costs are incurred to handle different interfaces.

Because of the growing network demands of broadband networks, a new approach is needed that is of relatively low cost and more flexible than today's call model and trigger systems. An approach that separates service control from transport elements and allows service signaling directed to broadband network control elements would help satisfy these needs.

An example where a new approach to handling service signaling is needed is in the implementation of the Internet Protocol (IP). In various forms of IP traffic, service signaling, policy implementation, and data transport are handled together, and typically by the same device such as a router or firewall. Processing solely in the transport device complicates implementing a secure network over a wide geographic area since policy data must be coordinated across a large number of devices. Due to this scalability issue, a further need exists to separate the service signaling from data in IP data packets so that policy requests may be more centrally processed.

Another example where a new approach to handling service signaling is needed is in the implementation of Virtual Networks (VNs). A VN includes a group of service users that have specific policies and customized network behavior associated with the group. The policies and behaviors can relate to performance and Quality of Service (QoS) guarantees, routing procedures, addressing, billing, privacy, and to which network services the user has access. Additionally, since issues regarding network resources in a shared use mode versus dedicated use mode are not essential to the concept of a VN, a VN provider may choose any number of ways to implement a VN capability. Due to the diversity of services a VN provider may implement, a need for a new service signal processing architecture exists to efficiently accommodate VN services.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS

Figure 1:
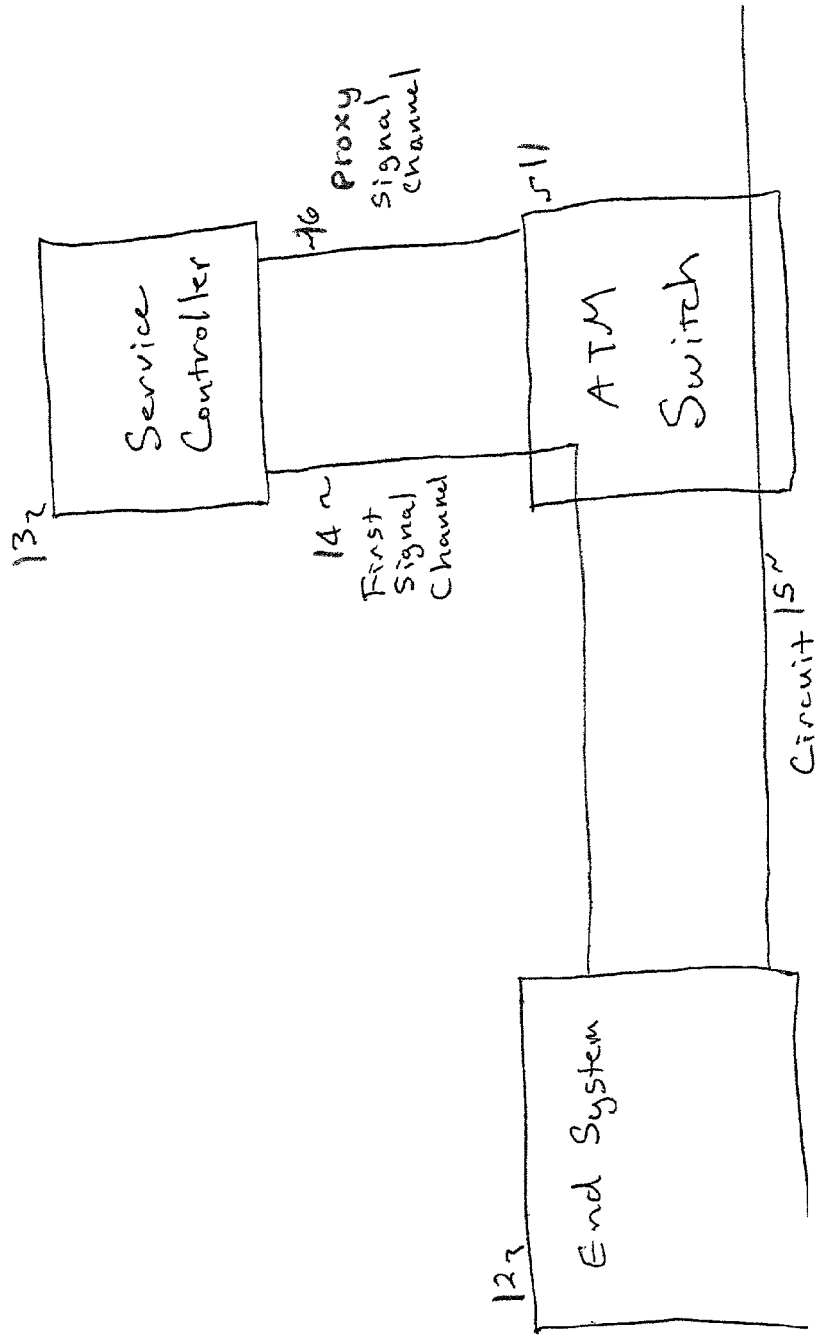
FIG. 1 shows an exemplary architecture of a system that processes service signaling in a controller separate from a switching element, according to an aspect of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

According to an aspect of the present invention there is provided a system for processing ATM SVC signaling which includes an ATM switch connected to an end system, a controller, a signaling channel, and a proxy signaling channel. The ATM switch receives an ATM SVC connection request from the end system. The controller connected to the ATM switch controls the processing of the ATM SVC connection request. The signaling channel terminates at the end system and at the controller with the signaling channel being routed through the ATM switch. The ATM switch receives signaling, associated with the request, over the signaling channel and the ATM switch forwards the signaling to the controller via the signaling channel. The proxy signaling channel terminates at the controller and at the ATM switch. The controller communicates proxy signals over the proxy signaling channel to instruct the switch to set up an SVC connection in response to the request received over the signaling channel.

In another aspect of the invention, the signaling channel may be a PVC. The system may, additionally, contain a policy database communicating with the controller, the policy database storing policy information that is queried by the controller in response to the ATM SVC connection request. In yet another aspect, the ATM SVC connection may carry UNI signaling. Further, the end system may be an ATM SVC signaling device. Moreover, the proxy signal may be SVC connection protocol compliant signaling. In another aspect of the invention, a second controller may become connected with the ATM switch when the controller becomes unavailable. In yet another aspect of the invention, the ATM switch may further be multiple switches, each ATM switch being connected to the controller. Further, the system may intercept IP packets and retrieves IP signaling for processing by the controller to support Internet Protocol in another aspect of the invention. The system may further include an IWF gateway that converts non-system signaling into ATM signaling. Furthermore, the system may have a second controller that becomes connected with the ATM switch when the controller becomes unavailable.

According to an alternate embodiment, the processing of ATM SVC signaling includes receiving by a first controller a first connection setup signal from a first end system, the first connection setup signal being routed through a first ATM switch. The method also includes sending a first proxy signal to the first ATM switch in order to set up an SVC connection across an ATM network in response to the received first connection setup signal.

The process may further include checking a policy by the first controller in response to the received first connection setup signal and determining whether to grant a connection request. Furthermore, the process may include sending a second proxy signal from a second ATM switch to a second controller, and sending a second connection setup signal from the second controller to a second end system through the second switch. Moreover, the process may further include receiving by the second controller a first connection connect signal from the second end system; the connection connect signal being routed through the second ATM switch. The process may also include sending a third proxy signal from the second controller to the second ATM switch. The process, moreover, may include sending a second connection connect signal from the second ATM switch to the first ATM switch and sending a fourth proxy signal from the first ATM switch to the first controller. The process, further, may include sending a third connection connect signal from the first controller to the first end system, the third connection connect signal being routed through the first ATM switch.

In another aspect of the invention, the process may further include receiving via a PVC the first connection connect signal. The first proxy signal may be SVC connection protocol compliant signaling. The process, moreover, may include intercepting IP packets and retrieving IP signaling for processing by the first controller to support the Internet Protocol. The process, furthermore, may include converting non-system signaling into ATM signaling.

The present invention relates to processing of service signaling. Service signaling is defined as any signaling that represents a request for a network service. The network service may be a service at any "level"—a transport service or a higher layer service (e.g., end user or content service). Service signaling originates from service subscribing entities, such as end users, enterprise networks, or peer networks. Peer networks are considered service subscribing entities because, by virtue of interconnecting with them, a service signaling subnetwork grants the peer networks the right to place service requests into the service signaling subnetwork. By this definition, subscribers (individuals and enterprises) and peer networks use service signaling to request services, and a telecommunications carrier network uses service signaling to request services in peer networks or in third party networks (networks from which services are obtained that are not implemented by the telecommunications carrier, or networks through which a connection must be completed).

Service signaling is subject to authorization and other service policy checks before granting the requested service, because service signaling represents a request for a network service. In general, the policy checks entail a combination of the subscriber's service features and limits, and access rights and limits. These policies may be applied in the context of a virtual network where features and limits are determined not just by the subscribers involved but by the virtual networks to which the subscribers belongs.

According to the present invention, all service signaling travels to a network element when the service signaling is processed. By signaling to a network element, policy management can be applied, user profiles accessed to determine disposition of the request, and all similar functions can be performed before any actions are taken to set up connections or dedicate network resources to the user request. And if this approach is taken for all access types, the problems of insistent transport element behavior in handling the user's service request are avoided.

The following description is primarily in terms of a specific form of service signaling: requests for asynchronous transfer mode (ATM) switched virtual circuit (SVC) connections. Although the description is provided with respect to a specific type of service signaling for the sake of explanation, it is recognized that the present invention applies to any kind of service signaling. Thus, the present invention is not intended to be limited to ATM SVC requests.

The present invention also relates to control signaling. Control signaling includes any form of signaling, typically within the network, that controls one network element from another network element. Control signaling is not considered a service invocation; it is the signaling required to implement distributed control of network element functions.

UNI Proxy is an example of a control protocol. Another example is a protocol between an information service implemented in a session controller and a content server. In general, network resources such as content servers, bridging devices, etc., provide control signaling interfaces to service controllers that implement services in accordance with instructions received from these network resources.

Referring now to FIG. 1, an embodiment of the invention is described. An end system (e.g., PC, workstation, LAN device, phone, etc.) 12 has a signaling channel 14 to a service controller 13 (also referred to as a session controller), via a switch 11, such as an ATM switch. The service controller 13 processes all service signaling received from the end system 12 and also includes a proxy signaling channel 16 connected to the ATM switch 11. In one embodiment, the signaling channel 14 is "nailed up". That is, the signaling channel may be a permanent virtual circuit (PVC) connection.

An exemplary ATM switch 11 is the MainStreetXpress 36170 Multiservices Platform available from Alcatel of France. An exemplary session controller 13 operates on a Sun Netra Server available from Sun Microsystems, Inc., of Palo Alto, Calif.

When the end system 12 has requested an ATM SVC connection, the service controller 13 establishes the circuit 15 by signaling to the switch 11 over proxy signaling channel 16. That is, according to the present invention even though the end system 12 has the capability to signal, the signaling stream is redirected to the controller 13, which proxy signals for the end system 12. Placing signal processing in a component 13 separate from the switching element 11, allows the network provider to apply policy to the connection handling in the adjacent controller 13.

Additional advantages of the present invention include the timely evolution of services and transport capabilities due to independent upgrade capability, causing upgrades to become less costly. Additionally, costs lessen for service level Operations, Administration, and Management (OA&M) because fewer network elements and fewer network element types must have service level OA&M interfaces. Moreover, service functions can ride the dropping price/performance ratio of computing platforms because the components in the system can be non-proprietary and the same service can be provided to all subscribers, regardless of access type. Furthermore, nomadic users can access their services and profiles no matter where or how they access the network.

Unlike the narrowband intelligent network design, the switching and access elements generally do not invoke triggers or functions from the service signaling subnetwork. Rather, the user's signaling travels directly to the service controller 13 via a nailed up signaling channel 14 through the access nodes and switches 11, or via a dynamically established signaling channel 14.

The signaling protocol used depends on which network service the user is invoking. The service controller 13 acts on the service request accessing the user profile, applying policy management, etc. and then signals the switching components 11 to establish the connections required by the service. If the service controller 13, due to a policy management decision, for example, rejects the service request, the end-system 12 is notified and no connection control commands are issued by the service signal controller 13 to the switching element 11. The policy profile may be stored in the service controller 13 or alternatively may be stored in a separate database (not shown) that can be accessed by multiple service controllers 13.

In native ATM signaling protocols such as UNI 3.1/4.0, a virtual channel on the subscriber's physical interface is configured as the logical signaling channel for the protocol. Additional protocols like an n-way multi-channel connection protocol may be assigned a dedicated signaling virtual channel from the space of reserved virtual channels, or the protocols may be multiplexed with other protocols on existing signaling virtual channel. In the latter case, a protocol discriminator byte already defined in message headers could be used to differentiate multiplexed protocols. Thus, the signaling subnetwork is designed to work with both multiplexed and dedicated signaling virtual channels.

In native ATM services, services are characterized by the signaling mechanism and transport encapsulation. The International Telecommunications Union (ITU) and the ATM Forum have defined a native ATM service signaling mechanism that uses a dedicated virtual channel between an end system 12 and the network for the signaling channel 14. Thus, it is preferred to employ the defined service signaling mechanism for ATM SVC services. More specifically, to support standard end systems 12 and standard end system software that use ATM UNI signaling, the end systems 12 should use VP=0/VC=5 as the signaling channel. The present invention is also flexible enough, however, to handle signaling channels for additional service protocols. Similarly, even for ATM SVC requests, alternate channels could be employed if desired.

Figure 2:
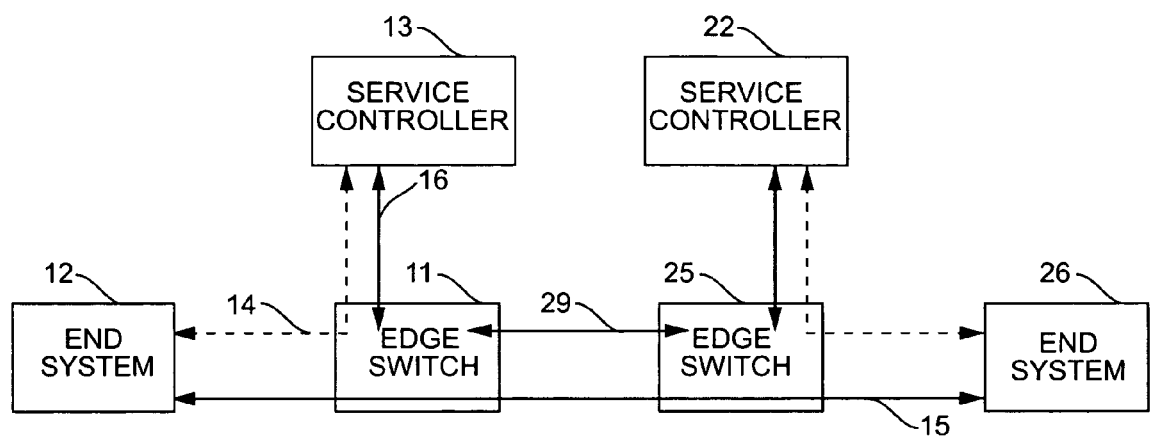
FIG. 2 shows an exemplary architecture including originating and terminating end systems, originating and terminating edge switches, and originating and terminating service controllers, according to an aspect of the present invention.

In one embodiment of the invention, the service controller 13 processes UNI 3.1/4.0 signaling for the ATM SVC service. As shown in FIG. 2, UNI signals are sent transparently from the user's end system 12 through the user's edge switch 11 to the service controller 13 that terminates the signaling protocol. After policy management, address translation, and other such service signaling functions are applied, the service controller 13 signals via the proxy signaling channel 16 using, for example UNI proxy 4.0, to establish the requested and authorized SVC 15. As described above, UNI from the end system 12 is terminated in the service controller 13, not the edge switch 11 that the end system 12 is physically homed on.

In UNI signaling on an SVC setup request from the originating end system 12 to a terminating end system 26, not only is the originating end system 12 originating UNI signaling proxied for, but so is the end system's 26 terminating UNI signaling (assuming the terminating end system 26 is an SVC service subscriber on the network). Although terminating end system's 26 signaling is not required to be proxied for, proxying terminating signaling is preferred. For example, in the case of a connection to an end system in an adjoining network that can be reached via alternate egress points, proxying terminating signaling allows instantiating terminal signal agents in the appropriate service controller, regardless of the selected egress point.

As additional service interfaces are provided by the network, other signaling protocols from the end system 12 will be handled in the same manner. The service controller 13, for example, will terminate the service signaling protocol, and, just as in the UNI case, session policy management is applied and the service controller 13 instructs the switch 11 to set up the necessary connections. Because a session may entail connections that do not traverse the originating edge switch 11, the session controller 13 has the ability to signal, via a network internal control protocol, to other session controllers 22 to set up connections between end systems 12, 26.

According to an embodiment of the present invention, proxy signaling is UNI 4.0, as described above with reference to FIG. 2. UNI 4.0 proxy signaling 28 is full proxy signaling. Thus, all UNI messages flow to the service controller 13, not just a selected subset. Proxy signaling occurs between the service controller 13 and a software function controlling the UNI in the edge switch 11. This allows the edge switch to forward signaling to a well known VCI/VP rather than acting on the signaling request.

UNI 4.0 has specified a form of proxy signaling in which a proxy signaling agent (PSA) can UNI signal for the end system 12. The proxy signaling agent function is one of the functions of the service controller 13. By definition, proxy signaling implies that when an edge switch 11 has a UNI message destined for an end system 12 on a particular port and Virtual Path (VP), the edge switch 11 sends that message on the signaling channel 14 instead, with an identifier of the original port and VP. Similarly, when a UNI message is received on the interface 14 marked with a particular port and VP, the switch 11 treats that message as though it was received from the end system 12 on that port and VP. The port and VP identifier are encoded using a virtual path connection identifier (VPCI) information element in UNI setup and call proceeding messages, in conjunction with a table, stored in the switch 11 and service controller 13, that relates VPCI values to port and VP identifier values.

Proxy signaling as defined in UNI 4.0 is sufficient as a control signaling protocol between the edge switch 11 and the service controller 13. As edge switches are built larger, however, the standard eight bit port identifiers may be too small to support all of the proxied ports. Thus, the standard can be modified or multiple proxy interfaces to a single switch can be used.

According to another embodiment, PNNI or AINI is used as a protocol rather than UNI, for example when signaling to another network occurs. In this embodiment, there is a need for tunneling and proxy signaling for PNNI or AINI on connection requests coming into the network. PNNI and AINI are service protocols that are used in requesting a network service and are also terminated in the service controller.

Referring again to FIG. 2, an example is described in which data originates in end system 26 and is routed through switch 25 and switch 11 and ultimately terminated at end system 12, which in this example is an edge device of another network. When routing connection requests to an adjoining network, PNNI or AINI proxy data can be used. PNNI or AINI control signals are tunneled from controller 22 via switching 25, 11 and terminated at the service controller 13. PNNI or AINI proxy control signals are then transferred between the service controller 13 and the edge device 12.

In this example, a control entity is instantiated in the service controller 13 of the egress edge switch 11 for this connection. The receipt of the proxied setup message in the service controller 13 can serve as the control signal that causes the instantiation. In the case when the connecting network is a UNI network, PNNI control information is transferred between edge switch 25 and edge switch 11. As in the embodiment described above, UNI proxy information is communicated between service controller 22 and edge switch 25 and UNI 3.1/4.0 is communicated between end system 26 and service controller 22 through edge switch 25.

Figure 3:
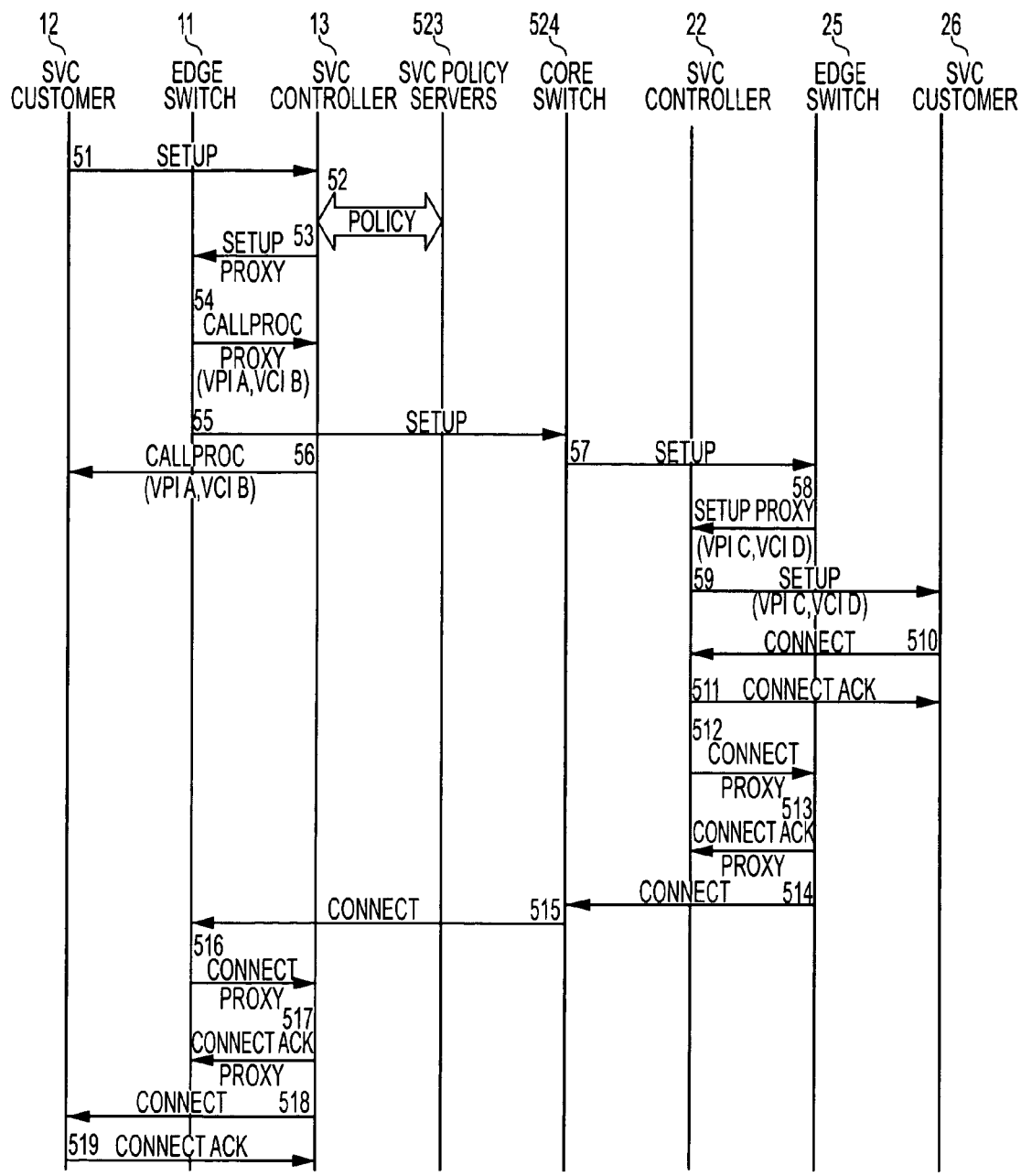
FIG. 3 is a call flow diagram showing an exemplary SVC call establishment, according to an aspect of the present invention.

FIG. 3 shows an exemplary call flow for an SVC call establishment. Initially, an SVC call is initiated by a calling party (SVC service customer) 12 sending a UNI 3.1/4.0 setup request to the service controller 13 via the edge switch 11 at step 51. The SVC service controller 13 then applies policy checks for both the calling and called party ends of the call at step 52. In general, the policy checks could entail a combination of the subscribers' service features and limits, and access rights and limits.

Once the policy checks have affirmed the connection is to continue, the SVC service controller 13 then sends a UNI 4.0 proxy setup request to the ATM edge switch 11 in step 53. The ATM edge switch 11 then sends a call proceeding signal to the SVC service controller 13 with an allocated VPI A/VCI B setting in step 54. The ATM edge switch 11 then sends a PNNI setup signal to an ATM core switch 524 in step 55.

The core switch 524 is a switch that is not directly connected to an end system 12 and functions primarily as an intermediary switch between edge switches. The core switch 524 is different from an edge switch 11, which is a switch that is connected to an end system 12.

After the core switch 524 receives the setup signal, the SVC service controller 13 then sends a call proceeding signal containing VPI A/VCI B call information to the calling end system 12 in step 56. The ATM core switch 524 then sends a PNNI setup signal to the edge switch 25 in step 57. The edge switch 25 then sends a proxy setup signal to the SVC service controller 22 providing VPI C, VCI D information in step 58. The SVC service controller 22 then sends a setup signal to the called party (SVC service customer) 26 with VPI C, VCI D signaling information in step 59.

When the setup signal has been processed by the called party 26, the called party 26 sends a connect signal to the SVC service controller 22 in step 510. The SVC service controller 22 then sends a connect acknowledgment to the called party 26 in step 511. The SVC service controller 22 then sends a connect signal to the edge switch 25 in step 512, and the edge switch 25 responds with a connect acknowledgment to the SVC service controller 22 in step 513.

Subsequently, the edge switch 25 sends a connect signal to the core switch 524 in step 514. The core switch 524 then sends a connect signal to the edge switch 11 in step 515. In response, the edge switch 11 sends a connect signal along the proxy interface to the SVC service controller 13 in step 516. The SVC service controller 13 then replies with a connect acknowledgment in step 517. The SVC service controller 13 then sends a connect signal to the calling party in step 518. Finally, the calling party 12 sends a connect acknowledgment to the SVC service controller 13 in step 519 and the SVC is established. Once an SVC calling party has established an SVC to the called party, SVC data flows can be communicated between the two parties.

In order to simplify the above example, virtual calling and called party addresses placed in the setup message have not been considered. In such a scenario, the SVC service controller 13 on the calling side applies a policy based upon virtual addresses. To initiate the proxy setup, the controller 13 queries an address translation device and replaces the virtual addresses with physical addresses. On the called side, the SVC service controller 22 replaces the physical addresses with their corresponding virtual addresses and forwards the setup signal to the called party 26.

Figure 4:
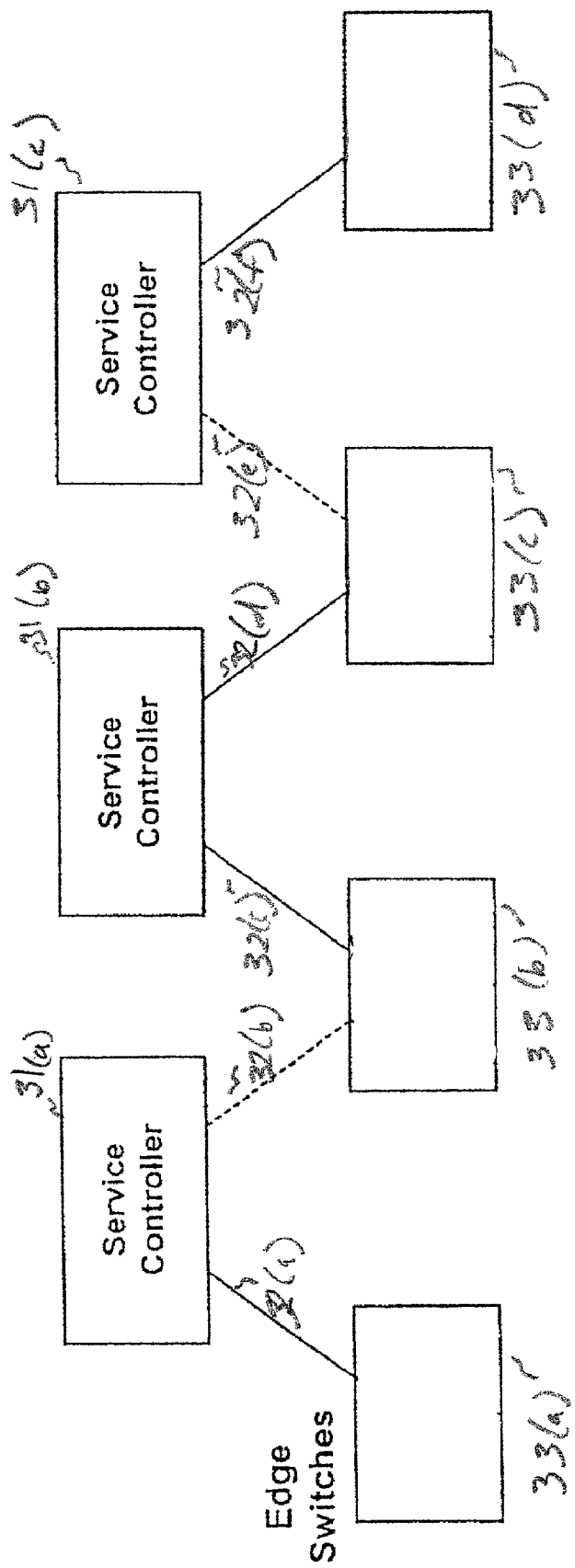
FIG. 4 shows an exemplary service signaling topology using multiple homing of switches to service controllers, according to an aspect of the present invention.

The present invention supports variations in routing of signaling for purposes such as load balancing across service providing systems, and routing to alternate service providing elements when primaries are out of service due to planned maintenance outages, unscheduled outages, or the like. FIG. 4 shows a service signaling topology where edge switch 33(a) and edge switch 33(d) are single-homed via connection 32(a) and connection 32(f) to service controller 31(a) and service controller 31(c), respectively. Edge switch 33(b) and edge switch 33(c) are dual-homed via connection 32(b), connection 32(c), connection 32(d), and connection 32(e), to service controller 31(a), service controller 31(b), and service controller 31(c), respectively.

In order to build an acceptable level of fault tolerance, the failure of a single service controller will result in minimal service unavailability. Single link failures are recovered at the access layer in a way that is transparent to the signaling stream, and so do not require fault tolerance mechanisms in the service signaling architecture.

In the case of failure of an edge switch's service controller, the edge switch is reconfigured to establish new virtual channel cut-throughs from the signaling channels to the physical interface to an alternate service controller. All switches served by the failed controller do not have to be reconfigured to the same alternate service controller. By using multiple alternates, no one service controller sees a significant load increase due to a failure. When the failed controller comes back online, the original virtual circuit cut-throughs can be re-established.

In the event a service controller needs to be taken off-line or malfunctions, an automatic switch over procedure can be implemented using one or more surviving service controllers. These remaining service controllers can be used to sense the failure of the non-functioning service controller and to reconfigure signaling channels in switches using a virtual switch interface. Failure of a service controller is automatically detected and recovery procedures are invoked automatically, even including the coordination of other network components. Similarly, restoration to the pre-failure configuration automatically occurs in a coordinated fashion including controlling when automatic restoration takes place.

When the alternate virtual circuit cut-throughs are established to the alternate service controller, the edge switch is unable to resynchronize the signaling channel because sequence numbers of signaling protocol data units are not available at the alternate controller. As a result, the edge switch restarts the signaling links with the alternate controller. Because resynchronization does not succeed, the edge switch tears down any SVCs set up by the failed signaling channel to protect the resources from being held in a busy state indefinitely due to loss of signaling messages.

Loss of SVCs occurs no matter how quickly the alternate virtual circuit cut-throughs are established. The length of that delay affects how soon the user can reestablish new SVCs. This same behavior occurs when the failed service controller is restored.

Ultimately, it is desirable to avoid the loss of established SVCs on a service controller switch-over. To avoid the loss of an SVC, a level of coordination occurs between transport elements and services layer to allow some sharing of call state information and possibly resource allocation information.

Figure 5:
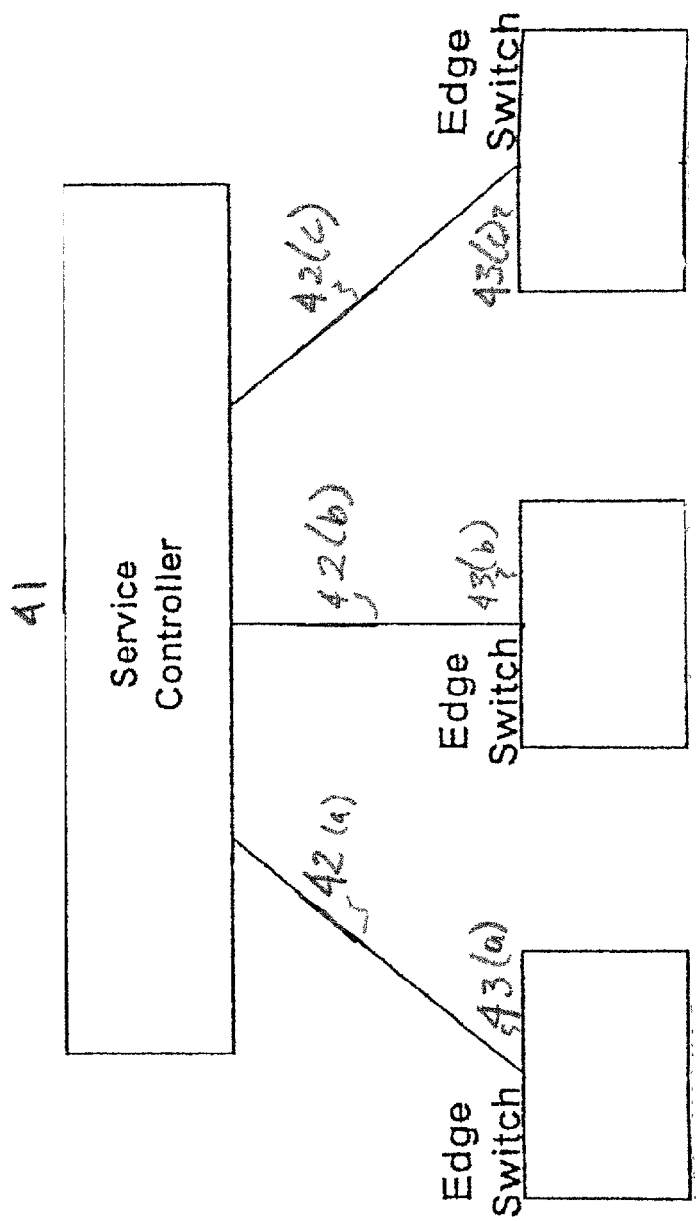
FIG. 5 shows an exemplary service signaling topology in which a single service controller controls multiple switches, according to an aspect of the present invention.

FIG. 5 shows a topology where multiple edge switches 43(a), 43(b), 43(c) are controlled by a single service controller 41. This topology allows centralized modifications at a single service controller 41 to affect the operations of multiple switches. Links 42(a), 42(b), 42(c) represent the connectivity between the edge switches 43(a), 43(b), 43(c) and the service controller 41.

Figure 6:
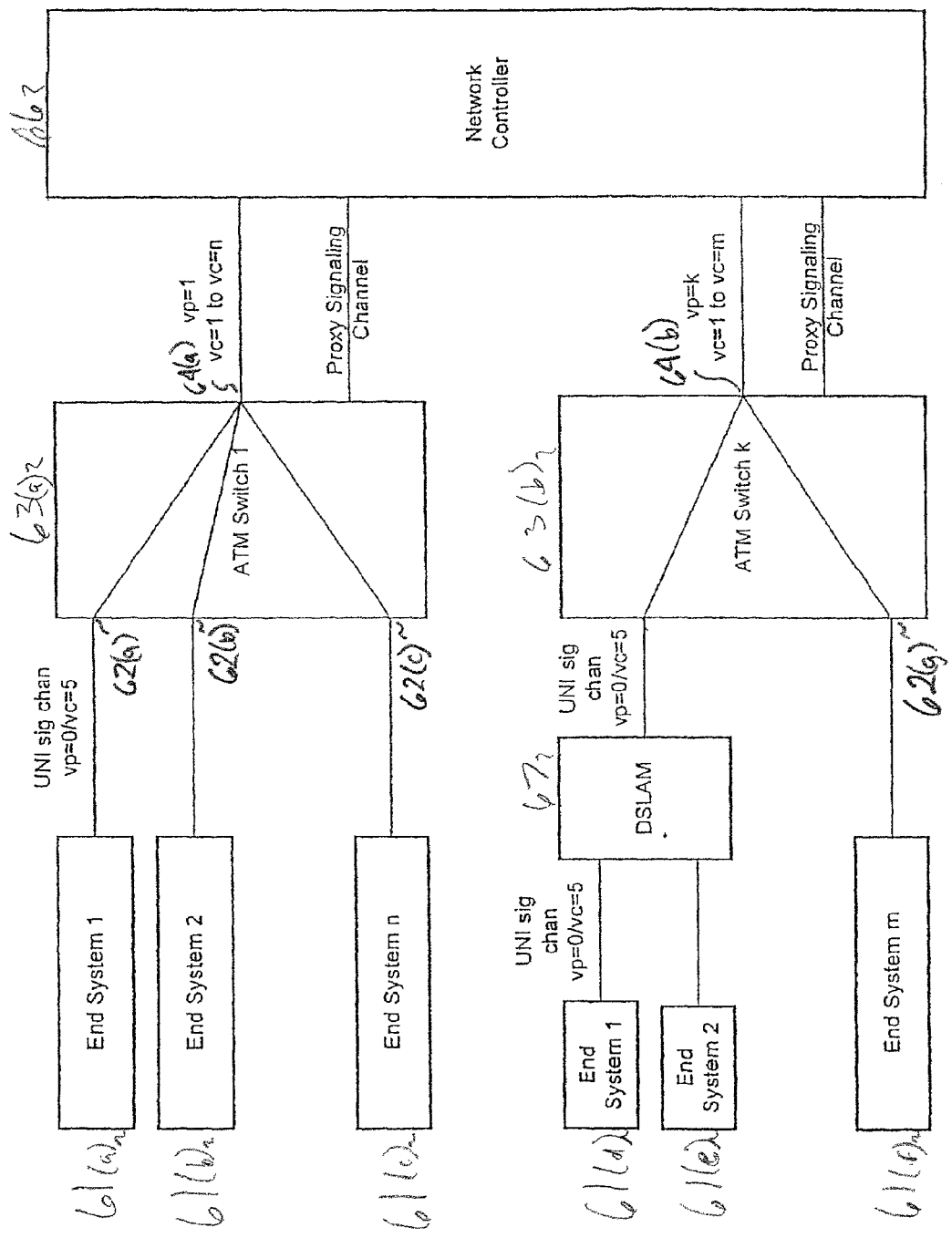
FIG. 6 shows an exemplary signaling channel configuration, according to an aspect of the present invention.

To bring user-to-network signaling directly to a service controller, it is advantageous to adopt a convention on the routing of signaling channels and the treatment of these channels in intervening switches. The present invention handles UNI signaling for the ATM SVCs and also signaling channels for additional service protocols that will appear in the future. With reference to FIG. 6, an embodiment that accounts for all of these service signaling protocols is described.

In the example shown in FIG. 6, the service controller 66 serves a group of edge switches 63(a), 63(b). In turn, each edge switch terminates a number of user-to-network interfaces, each of which supports one or more logical signaling channels. To support standard end systems 61(a), 61(b), 61(c), 61(f) and associated standard end system software that use ATM UNI signaling, the end systems 61(a), 61(b), 61(c), 61(f) use VP=0/VC=5 as the signaling channel into ports 62(a), 62(b), 62(c), 62(g) of switch 63(a) and switch 63(b). As described above, that UNI protocol sent on the signaling channel is terminated in the network controller 66, not the switch 63(a), 63(b).

On each port 62(a), 62(b), 62(c), 62(g) with a UNI signaling channel, channel VP=0/VC=5 is "nailed up" in the switch 63(a), 63(b) to a controller port 64(a), 64(b). Each controller port 64(a), 64(b) is connected to the network controller 66. The "nailed up" connection of course passes transparently through the ATM switch 63(a), 63(b). That is, the switch 63(a), 63(b) performs no inspection of the data on this channel.

The switch 63(a), 63(b), however, maps VP=0/VC=5 to VP=x/VP=y for the controller ports 64(a), 64(b). In this embodiment, x is associated uniquely to each ATM switch 63(a), 63(b), and y is associated uniquely to each port 62(a), 62(b), 62(c), 62(g) on that switch 63(a), 63(b). These associations are network configuration data. The network controller 66 can then identify the switch 63(a), 63(b) and each port 62(a), 62(b), 62(c), 62(g) on the switch 63(a), 63(b) associated to each signaling channel by the VP/VC of the cells received.

Any application of service policy or user profile access, however, should be based on the calling party number in the SETUP message. That is, because the present invention supports nomadic users, the switch and switch port from which the SETUP was sent does not identify the user sending this request.

The present invention also operates in a digital subscriber line (DSL) environment. In such an environment, a digital subscribe line access multiplexer (DSLAM) 67 may be employed. When the DSLAM 67 is used with end systems 61(*d*), 61(*e*) signaling UNI to it 67, the UNI ports are configured such that VP=0/VC=5 is used on the DSLAM's link to the edge switch 63(*b*). This setting is also used for any other type of access or gateway device that signals UNI to the service signaling controller 66.

Because the DSLAM 67 terminates a subscriber's signaling, the signaling channel from the subscriber's end system 61(*d*), 61(*e*) is not cut-through the DSLAM 67. However, the signaling channel from the DSLAM 67 to the service controller 66 is configured in a manner similar to described above. That is, the signaling channel runs from the DSLAM in a cut-through fashion through the edge switch 63(*b*) and terminates on the service controller 66. In cases when an intermediate access node is not involved in signaling, such as FTTC or switched-based ADSL, the signaling originates from the end system itself.

Once the DSLAM 67 connects to the edge switch 63(*b*), the remaining connections are set up, as described above, between the switch 63(*b*) and the network controller 66. More specifically, within each switch, the user-side signaling channels for each DSLAM are virtual circuit-switched on to a common physical interface to the service controller 66, with each separate signaling channel occupying its own dedicated VP/VC on that physical interface. This is done for each edge switch 63(*a*), 63(*b*) within the service controller's domain. In this case, the service controller 66 sees a dedicated virtual signaling channel for each DSLAM 67 (in FIG. 6, only a single DSLAM). Within the service controller 66, the triplet (physical port, VP, VC) can be uniquely associated with a specific DSLAM user-side port. Also as described above the called party number is used to identify the service requestor.

The following signaling scenario illustrates the placement of an ATM SVC call between two DSLAM terminated subscribers. Initially, the subscriber's application in the originating terminal signals UNI to the network. The DSLAM terminates that signaling, and in response, signals UNI to the edge switch. That is, the DSLAM propagates the calling party number in the setup message received from the subscriber to the Setup message sent to the edge switch. In this process, the DSLAM applies connection admission control to decide if sufficient DSLAM resources and link bandwidth are available to allow the connection. However, beyond that availability check, the DSLAM performs no other SVC service processing.

Next, the UNI signaling from the DSLAM is passed transparently to the session controller. The subscriber is identified by the calling party number field in the received address associated to the port on which the original setup message was received. At this point service policy is applied, the caller's user profile is accessed, and it is decided whether to allow the service request.

Assuming the service request is granted, the session controller proxy signals to the edge switch to set up the desired connection. Subsequently, the setup proceeds normally in the transport network. In other words, the edge switch uses PNNI signaling to create a source route for the SVC, and then the edge switch and the subsequent switches in the path use PNNI to signal the setup of the SVC.

At the terminating edge switch, the UNI signaling destined for the DSLAM is proxied to the service controller. In this case, no service processing is required because it was performed at the originating service controller. The service controller uses UNI to signal to the DSLAM transparently through the edge switch and the SVC setup completes normally.

The present invention also provides IP-based service signaling interception allowing an IP end system to invoke ATM services. That is, the IP end system can use the ATM services to transport IP packets over an ATM network and communicate with a distant IP network server or IP network element. The invention's particular IP-over-ATM implementation creates a service signaling subnetwork within the IP-over-ATM network that carries intercepted service signaling from IP packets to service controllers. In one embodiment, the interception of IP service signals occurs at the edge of the service signaling subnetwork. Once retrieved, IP service signals are routed to a destination service controller that translates IP service signals into proxy signals that a network switch can process. The IP packet is then packaged and handled by the ATM network in a way similar to that intended by the IP service signals of the original IP packet.

In cases where IP service signals are not retrievable or are not mapped to ATM services, the IP packets associated with the IP service signals may still be routed through the ATM network. Alternatively, the IP packets may be directed away from the ATM network to a traditional IP network. The present invention's ability to separate service signaling from at least some IP transmissions allows ATM SVC services to be employed.

In an IP-over-ATM system, SVC service requests can be invoked by an IP service signal to set up an SVC that is used as an IP layer 2 link, to connect to an IP router, to connect to an IP authentication server, or to connect to another like device. Once the SVC is set up, IP packets can be packaged and transmitted over an ATM system.

Moreover, in IP-over-ATM transport, the ATM connections can be established by the service controller initiating a proxy connection setup. In the case of IP class of service flow, the controller can provide the end-system with a label for use data packets, or download packet processing rules to the classifying router at the edge or both to provide the appropriate class of IP transport.

By combining IP and ATM technologies, IP and ATM functionality can be reused to keep capital and operations cost down. For example, explicitly signaled IP services and native ATM services are quite similar in their signaling operation with regard to policy checking, and hence, reuse of policy servers and policy checking mechanisms and protocols can result in cost savings.

The present invention provides a common architecture for network based services where there is a service signaling phase, either IP or ATM signaling, and where the service controller authorizes the request based on subscriber data, and then uses service control signaling to establish User-to User or User-to-Content Server connections, either true ATM connections, or IP class of service flows.

The present invention also allows peer networks to invoke services from the service signaling subnetwork. This is accomplished by an interworking function (IWF). The peer networks could be another carrier's broadband network, the PSTN, Voice over IP networks, etc.

In cases when interworking is required, it can be protocol interworking, transport format interworking, or, most commonly, both. In each scenario, the interworking device may be located on the customer premises. For example, a home gateway can be employed that interfaces an analog phone on the customer side and uses digital signaling and voice encoding from the home gateway to the network. In other cases, the interworking can be performed at gateways at the edge of the service signaling subnetwork. For example, an IWF gateway can be provided that terminates PSTN trunks and SS7 signaling and translates the signaling into a form the service signaling subnetwork can process. Another example is an IWF gateway that converts ISDN PRI D-channel connection signaling from a peer network to ATM UNI for processing by the service signaling subnetwork. Interworking legacy service protocols and transport formats at the edge of the service signaling subnetwork via a gateway is a very cost effective approach to the design of a multi-service network with interconnections to various forms of customer premise equipment (CPE) and peer networks.

In some cases, the service signaling subnetwork will interconnect with peer legacy networks where the legacy network has a very different version of a service than the service signaling subnetwork. In order to allow a service invocation to span the service signaling subnetwork and the legacy networks, the service signaling subnetwork could implement a different version of service for each interconnected legacy network. Alternatively the service signaling subnetwork can implement a broadband version of the service that is invoked with a "native" protocol, the protocol corresponding to the service signaling subnetwork version of the service. For example, the native protocol may be an IP protocol or another network's ATM protocol which can be interworked into the service signaling subnetwork protocols at an IWF gateway on the edge of the service signaling subnetwork.

Where policy data is required at an IWF, the IWF can use the same data management architecture that the service controllers use. For example, data can be obtained from directory servers in the service signaling subnetwork via LDAP interfaces. Depending on the performance requirements and the amount of data involved, the data can either be cached at the IWF or retrieved from a policy database. In either case, the IWF data is administered in conjunction with other service data in the services network. The same redundancy and distribution mechanisms which allow the service controllers to access network data should be used for IWFs. This integration reduces the cost of policy coordination and allows for effective service assurance activities because all relevant data is available in a common directory system.

The IWF gateway performs the service interworking, address translation, and related policy management. Depending on the internetwork interface, information available across that interface may be relayed in the UNI setup message in appropriate information elements (or in the free form Broadband Higher Layer information element). That information can be used for connection policy management, address translation, and supplementary service propagation (calling line id, auto-callback, etc). The approach can also be used for out of band signaling between networks. SS7 ISUP will be used as an example. SS7 signaling can terminate in the gateway device and be translated into UNI commands for service signaling subnetwork processing.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to E-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., TCP/IP, UDP/IP, HTML, SHTML, DHTML, XML, PPP, FTP, SMTP, MIME); peripheral control (IrDA; RS232C; USB; ISA; ExCA; PCMCIA), and public telephone networks (ISDN, ATM, xDSL) represent examples of the state of the art. Such standards are periodically superseded by faster or more efficient equivalents having essentially the same functions. Accordingly, replacement standards and protocols having the same functions are considered equivalents.

What is claimed:

1. A system for processing ATM SVC signaling comprising:
an ATM switch directly connected to an end system, the ATM switch receiving an SVC connection request from the end system;
a non-switching capable controller connected to the ATM switch, the controller processing the SVC connection request including performing policy management for the ATM switch, the controller instructing the ATM switch to set up an SVC connection in response to the request received from the end system via the ATM switch;
a signaling channel terminating at the end system and at the controller, the signaling channel being routed through the ATM switch, the ATM switch receiving signaling, associated with the request, over the signaling channel, the ATM switch forwarding the signaling to the controller via the signaling channel; and
a proxy signaling channel terminating at the controller and at the ATM switch, the controller communicating proxy signals over the proxy signaling channel to instruct the switch to set up the SVC connection in response to the request received over the signaling channel.

2. The system as set forth in claim 1, in which the signaling channel further comprises a PVC.

3. The system as set forth in claim 1, further comprising a policy database communicating with the controller, the policy database storing policy information that is queried by the controller in response to the SVC connection request.

4. The system as set forth in claim 1, in which the end system further comprises an ATM SVC signaling device.

5. The system as set forth in claim 4, in which the signaling further comprises UNI signaling.

6. The system as set forth in claim 1, in which the proxy signal further comprises SVC connection protocol compliant signaling.

7. The system as set forth in claim 1, further comprising a second controller that becomes connected with the ATM switch when the controller becomes unavailable.

8. The system as set forth in claim 1, in which the ATM switch further comprises a plurality of switches, each ATM switch being connected to the controller.

9. The system as set forth in claim 1, in which the system intercepts IP packets and retrieves IP signaling for processing by the controller to support Internet Protocol.

10. The system as set forth in claim 1, further comprising an IWF gateway that converts non-system signaling into ATM signaling.

* * * * *